US009317465B2

(12) United States Patent
Raskin

(10) Patent No.: US 9,317,465 B2
(45) Date of Patent: Apr. 19, 2016

(54) SYSTEM AND METHOD OF SENDING PCI EXPRESS DATA OVER ETHERNET CONNECTION

(71) Applicant: Janus Technologies, Inc., Half Moon Bay, CA (US)

(72) Inventor: Sofin Raskin, Half Moon Bay, CA (US)

( * ) Notice: Subject to any disclaimer, the term of this patent is extended or adjusted under 35 U.S.C. 154(b) by 251 days.

(21) Appl. No.: 13/840,559

(22) Filed: Mar. 15, 2013

(65) Prior Publication Data
US 2014/0281104 A1 Sep. 18, 2014

(51) Int. Cl.
*G06F 13/36* (2006.01)
*G06F 13/40* (2006.01)

(52) U.S. Cl.
CPC .................................. *G06F 13/4022* (2013.01)

(58) Field of Classification Search
CPC ................... H02N 21/43632; H02N 21/43615
USPC ........................................................ 710/311
See application file for complete search history.

(56) References Cited

U.S. PATENT DOCUMENTS

| 7,383,365 | B2 * | 6/2008 | Sauber ............................. 710/38 |
| 7,469,311 | B1 * | 12/2008 | Tsu ..................... G06F 13/4018 710/29 |
| 7,480,303 | B1 | 1/2009 | Ngai |
| 7,929,565 | B2 | 4/2011 | Winter |
| 7,934,033 | B2 | 4/2011 | Malwankar et al. |
| 7,945,721 | B1 * | 5/2011 | Johnsen ................ G06F 13/385 710/10 |
| 8,763,065 | B2 * | 6/2014 | Walter et al. .................. 725/133 |
| 8,948,173 | B2 * | 2/2015 | Elmaliah ....................... 370/392 |
| 2001/0021175 | A1 * | 9/2001 | Haverinen .............. H04L 29/06 370/230 |
| 2004/0177377 | A1 * | 9/2004 | Lin ................... H04L 29/06027 725/81 |
| 2005/0256990 | A1 * | 11/2005 | Schmisseur et al. ........... 710/306 |
| 2008/0056277 | A1 * | 3/2008 | Sharma ................... H04L 12/66 370/395.53 |
| 2008/0100629 | A1 * | 5/2008 | Bakalash et al. ............... 345/505 |
| 2008/0195777 | A1 * | 8/2008 | Dickens et al. .................. 710/62 |
| 2008/0276029 | A1 | 11/2008 | Haraden |
| 2008/0288987 | A1 * | 11/2008 | Teener et al. ..................... 725/74 |
| 2008/0320582 | A1 * | 12/2008 | Chen .................. H04L 63/0245 726/12 |
| 2009/0193204 | A1 * | 7/2009 | Rangarajan et al. .......... 711/158 |
| 2009/0254692 | A1 | 10/2009 | Feehrer et al. |
| 2010/0115174 | A1 | 5/2010 | Akyol et al. |
| 2010/0121972 | A1 | 5/2010 | Samuels et al. |
| 2010/0329285 | A1 * | 12/2010 | Stanton ............... H04L 67/1095 370/503 |
| 2011/0029695 | A1 * | 2/2011 | Kishore et al. ..................... 710/9 |
| 2013/0155170 | A1 * | 6/2013 | Eichen et al. .............. 348/14.02 |
| 2014/0037265 | A1 * | 2/2014 | Glen ............................. 386/230 |
| 2014/0115359 | A1 * | 4/2014 | Higuchi et al. ............... 713/320 |
| 2014/0201314 | A1 * | 7/2014 | Borkenhagen ...... G06F 11/1666 709/216 |
| 2014/0245053 | A1 * | 8/2014 | Yoshikawa et al. .......... 713/324 |

OTHER PUBLICATIONS

International Search Report issued Aug. 27, 2014 in corresponding PCT/US14/28912.

* cited by examiner

*Primary Examiner* — Faisal M Zaman
(74) *Attorney, Agent, or Firm* — Foley & Lardner LLP; Mark J. Danielson

(57) ABSTRACT

According to certain aspects, the present invention relates to a system and method of sending PCI Express video data over a lower speed Ethernet connection. In embodiments, a system according to the invention includes bridges at either end of an Ethernet connection that is disposed between a PCIe host and a PCIe device. According to aspects of the invention, the slower Ethernet connection can be used by forcing the faster PCIe link to operate at a slower rate than is possible, forcing a PCIe device with a large number of lanes to use only a single lane, forcing a PCIe link to use the shortest possible packet size and/or controlling the time when UpdateFC DLLP packets are sent.

17 Claims, 9 Drawing Sheets

SYSTEM AND METHOD OF SENDING PCI EXPRESS DATA OVER ETHERNET CONNECTION

FIELD OF THE INVENTION

The present invention relates to data communications, and more particularly to allowing PCI Express data to be sent over an Ethernet connection.

BACKGROUND OF THE INVENTION

Conventional computers have busses that connect a computer processor (e.g. an x86 CPU) with other system devices such as graphics cards. These busses typically comply with a standard, including the currently popular PCI Express (PCIe) standard. PCIe allows for data rates up to 8 Gbs, and PCIe devices can include 1 to 16" lanes.

These internal system data rates are much higher than many conventional network communication data rates. For example, Ethernet network communications were standardized as IEEE 802.3 in 1983. Over the years, Ethernet data rates have increased from the original 1 Mbps to the currently popular Gigabit Ethernet implementation (1000BASE-T), which has rates of 1 Gbps, as well as other higher rate implementations.

If it is desired to allow PCIe hosts to provide data to external peripheral devices via a network communication such as Ethernet, these differences in data rates would need to be accounted for and accommodated to avoid significant data loss, for example.

SUMMARY OF THE INVENTION

According to certain aspects, the present invention relates to a system and method of sending PCI Express video data over a lower speed network connection such as Ethernet. In embodiments, a system according to the invention includes bridges at either end of an Ethernet connection that is disposed between a PCIe host and a PCIe device. According to aspects of the invention, the slower Ethernet connection can be used by forcing the faster PCIe link to operate at a slower rate than is otherwise possible, for example forcing a PCIe device with a large number of lanes to use only a single lane, forcing a PCIe link to use the shortest possible packet size and/or controlling the time when UpdateFC DLLP packets are sent.

In furtherance of these and other aspects, a system according to embodiments of the invention comprises a host device including: a CPU system; a first bus that couples the CPU system to peripheral devices within the system; a bus host for managing transfer of data between the CPU system and the peripheral devices via the bus; a network connection to an external network; and a first bridge coupled to the bus that allows the bus host to communicate with an external peripheral device for transferring data between the CPU system and the external peripheral device via the network connection.

In additional furtherance of these and other aspects, a method according to embodiments of the invention comprises: transferring data from a CPU system to a system bus destined to a peripheral device that is logically coupled to the system bus; and transparently, to the CPU system and the peripheral device, bridging the data transfer over a network connection to the peripheral device, wherein a data rate of the system bus is faster than is capable on the network connection.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present invention relates to a system and method of sending data streamed at a high speed (e.g. video) such as in a PCI Express system over a lower speed connection such as an Ethernet connection. In embodiments, a system according to the invention includes bridges at either end of an Ethernet connection that is disposed between a PCIe host and a PCIe device.

Figure 1:
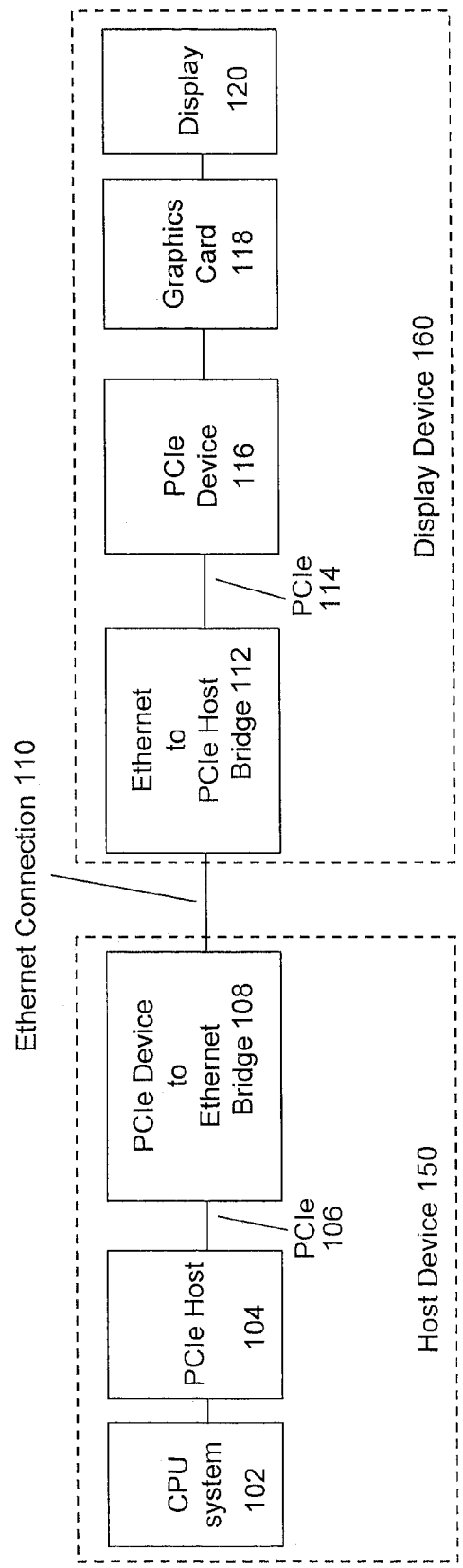
FIG. 1 is a block diagram illustrating one example system configuration according to embodiments of the invention.

FIG. 1 is a block diagram illustrating an example system 100 according to embodiments of the invention. As shown, system 100 includes a host device 150 and a display device 160 connected by an Ethernet connection 110.

It should be noted that although the present invention will be described in detail in connection with exemplary embodiments where the PCIe device is used for displaying graphics or video data, this example is non-limiting, and the invention can be used for streaming other types of PCIe data over a network connection such as an Ethernet connection.

Host device 150 includes CPU system 102, PCI Express Host 104, a PCIe connection 106, a PCI Express Device to Ethernet Bridge 108. In embodiments, device 150 is implemented by a conventional computer with a PCIe bus. In such embodiments, connection 106 and bridge 108 can be implemented by a PCIe card plugged in a PCIe bus slot. In these and other embodiments, CPU system 102 can be implemented by a conventional PC type computer running a conventional operating system such as Windows, and conventional software and hardware for sending data to a PCIe device, such as software for streaming videos to a display via a PCIe graphics card, and hardware such as frame buffers, a DMA controller, etc.

Display device 160 includes an Ethernet to PCI Express Host Bridge 112, a PCIe connection 114, a PCIe device 116, a Graphics Card 118, and a Display 120. In embodiments, device 160 is implemented by a conventional computer with a PCIe bus. In such embodiments, connection 114 and bridge 112 can be implemented by a PCIe card plugged in a PCIe bus slot. In these and other embodiments, PCIe device 116 and graphics card 118 can be together implemented as a PCIe compatible graphics card plugged into a PCIe bus slot. Display 120 can be any conventional type of display such as a LED or LCD flat screen, touch screen, etc.

In embodiments, bridges 108 and 112 can be implemented by an FPGA or an ASIC mounted on a PCIe compatible card. In other embodiments, bridges 108 and 112 can be implemented using processors and associated software/firmware.

In embodiments, Ethernet connection 110 is a Gigabit Ethernet connection (1000BASE-T). However, this example is not limiting and the invention can be applied to other types of Ethernet connections such as 10 GigE.

Figure 2:
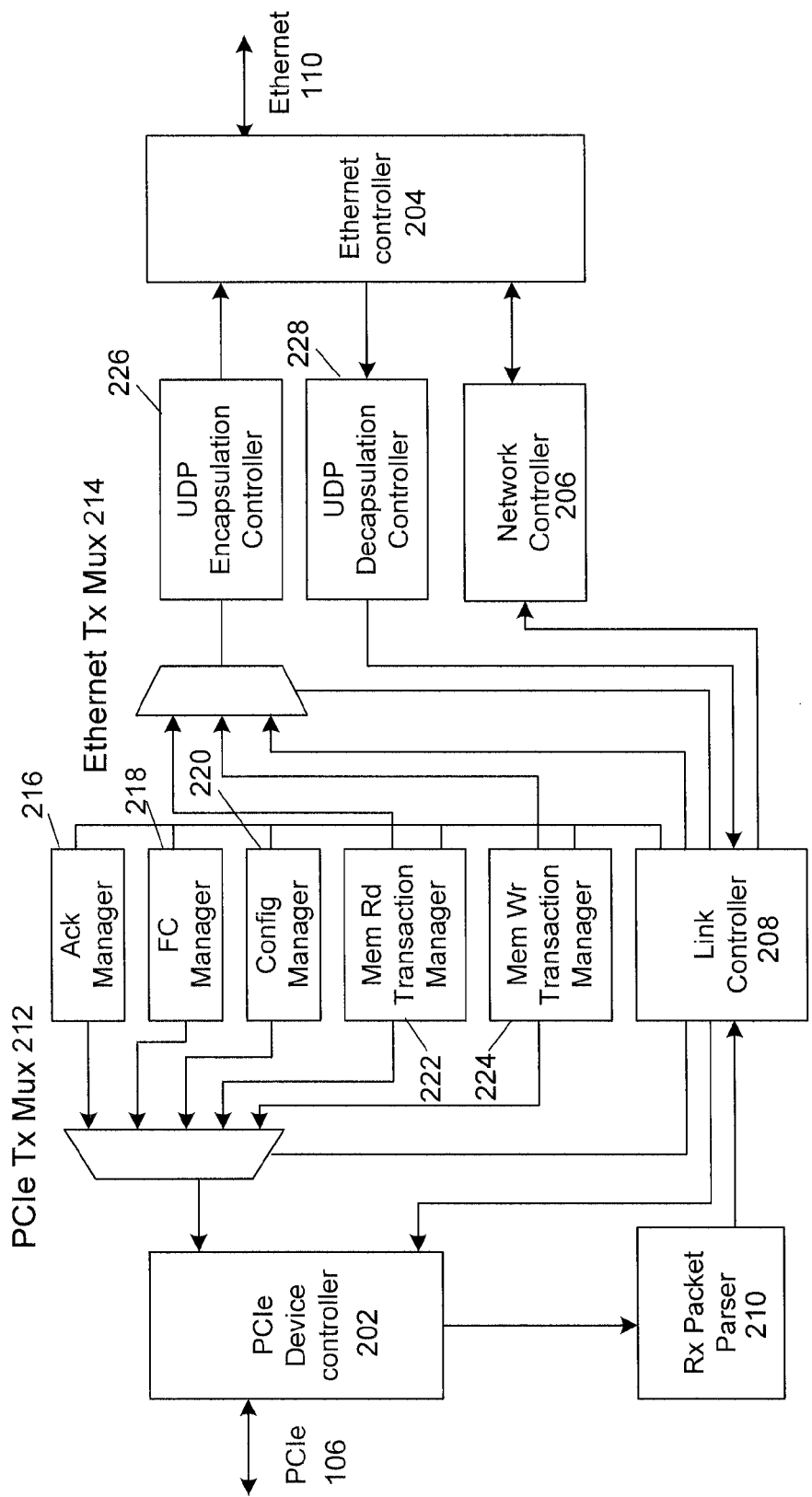
FIG. 2 is a block diagram of an example PCIe Device to Ethernet bridge according to embodiments of the invention.

FIG. 2 is a block diagram illustrating an example implementation of PCIe Device to Ethernet Bridge 108 according to embodiments of the invention.

As shown, bridge 108 includes a PCIe device controller 202 for interfacing with PCIe host 104 via connection 106, as well as Ethernet controller 204 for allowing PCIe hosts to send data to downstream PCIe devices such as PCIe device 116 via Ethernet connection 110 and bridge 112.

In embodiments, PCIe device controller 202 implements all PHY, Data Layer, and Transaction Layer functionalities defined by the PCIe specification. Ethernet Controller 204 implements Ethernet MAC and Data Link layer functions, as well as other protocols typically supported for normal operation of an Ethernet link, such as ARP, DHCP, ICMP, and others.

Network Controller 206 implements control over the Ethernet connection 110. Among its functions are IP address assignment and management. Additional functionality of network controller 206 in managing Ethernet connections will be described in more detail below.

Link Controller 208 implements the overall management functions of the Bridge. Among its functions are power-on reset sequence, processing of received (Rx) packets from PCIe Device controller 202, processing of Rx packets from Ethernet controller 204, selecting a current source of a transmitted (Tx) packet to PCIe controller 202 and Ethernet controller 204, and maintaining the overall state of the Bridge. Additional functionality of link controller 208 in managing PCIe connections and corresponding Ethernet connections will be described in more detail below.

Rx Packet Parser 210 implements basic parsing of received PCIe packets from PCIe device controller 202 and converts them into a format suitable for Link Controller 208 processing.

PCIe Tx Mux 212 selects a source for sending the next PCIe packet to PCIe device controller 202 under control of link controller 208. As shown, in this embodiment, possible sources include Ack manager 216, FC manager 218, Config manager 220, Mem Rd transaction manager 222, and Mem Wr transaction manager 224.

Ethernet Tx Mux 214 selects a source of sending the next Ethernet frame packet to Ethernet controller 204 under control of link controller 208. As shown, in this embodiment, possible sources include Mem Rd transaction manager 222, Mem Wr transaction manager 224 and Link controller 208.

In embodiments, Ack Manager 216 is responsible for prompt sending of PCIe ACK packets, flow Control (FC) Manager 218 is responsible for monitoring PCIe link flow control and sending of Flow Control packets, and Configuration Manager 220 is responsible for building and sending PCIe Configuration Read/Write and Configuration Completion TLP packets. Configuration manager 220 receives Configuration Read/Write TLP packets from PCIe Device Controller 202 and passes them to Ethernet controller 204. It receives Configuration Completion raw data from Ethernet controller 204, builds Completion TLP packets, and passes them to PCIe Device Controller 202.

Memory Read Transaction manager 222 is responsible for all aspects of managing PCIe memory read transactions. Memory Write Transaction manager 224 is responsible for all aspects of managing PCIe memory write transactions.

UDP Encapsulation Controller 226 adds appropriate headers to the raw data for sending UDP packets over Ethernet connection 110 using the UDP protocol. UDP Decapsulation Controller 228 extracts raw data from received UDP packets via Ethernet connection 110, and discards packets that contain checksum errors.

Figure 3:
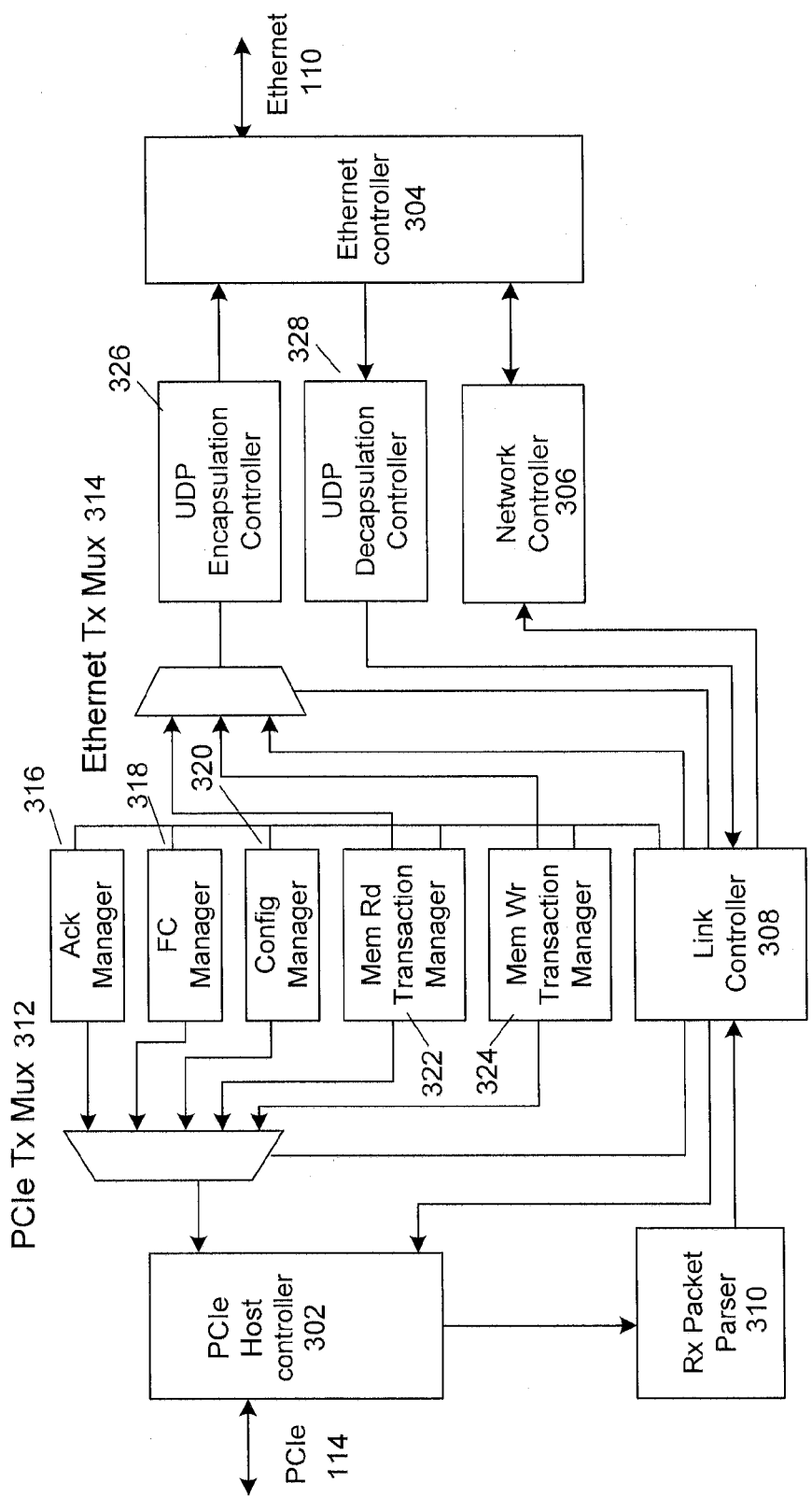
FIG. 3 is a block diagram of an example Ethernet to PCIe Host bridge according to embodiments of the invention.

FIG. 3 is a block diagram illustrating an example implementation of Ethernet to PCIe Host Bridge 112 according to embodiments of the invention.

As shown, bridge 112 includes a PCIe host controller 302 for interfacing with PCIe device 116 via connection 114, as well as Ethernet controller 304 for receiving data from upstream PCIe hosts such as PCIe host 104 via Ethernet connection 110 and bridge 108.

It should be noted that most of the components of Ethernet to PCIe Host Bridge 112 can be implemented similarly to like numbered components of PCIe Device to Ethernet 108, and so further details thereof will be omitted here for clarity of the invention.

In bridge 112, as opposed to the like numbered component in bridge 108, Configuration manager 320 receives Configuration Read/Write raw data from Ethernet controller 304, builds TLP packets from that data, and passes them to PCIe Host Controller 302. It receives Configuration Completion TLP packets from PCIe Host Controller 302, extracts raw data from the packets, and passes the completion data to Ethernet controller 304.

It should be apparent that similar differences exist for Memory Read/Write Transaction managers 322 and 324 as opposed to like numbered components in bridge 108.

Figure 4:
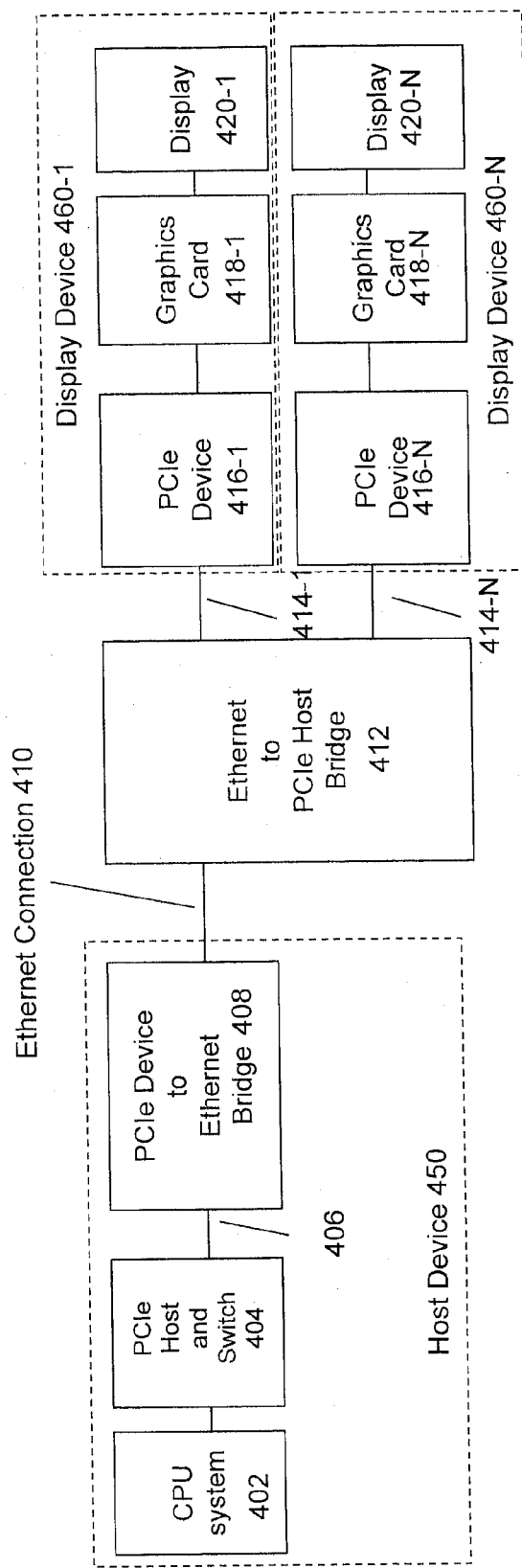
FIG. 4 is a block diagram illustrating another example system configuration according to embodiments of the invention.

FIG. 4 shows another possible system configuration according to embodiments of the invention. As shown, in these embodiments, a single Host Device 450 is connected to multiple (more than one) Display Devices 460-1 to 460-N. In this example embodiment, the same Ethernet connection 410 is used to carry data belonging to all PCIe devices.

Elements shown in FIG. 4 can be implemented the same as like-numbered elements shown in FIG. 1. Accordingly, further details thereof will be omitted for clarity of the invention. However, as shown in the embodiment of FIG. 4, host device 450 preferably includes PCIe host and switch 404 to enable communications with multiple PCIe devices. Essentially, the switch functionality in element 404 manages simultaneous communications between the host 404 and devices 416. It should be noted that these simultaneous communications can be different. For example, using switch 404, host device can cause one video be shown on one device, while simultaneously causing a different video to be shown on a different device.

Figure 5:
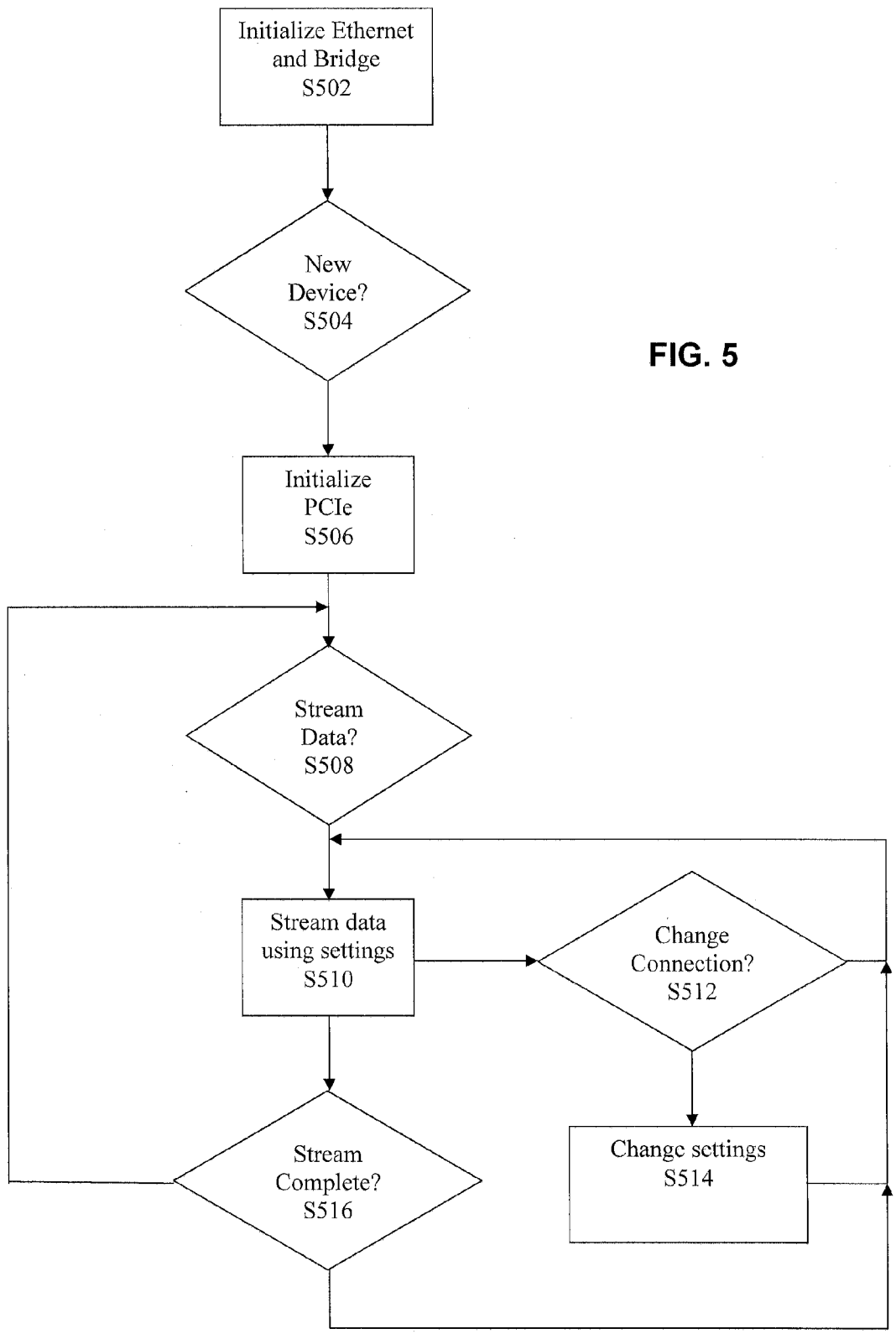
FIG. 5 is a flowchart illustrating an example methodology according to embodiments of the invention.

FIG. 5 is a flowchart illustrating an example methodology according to embodiments of the invention.

In step S502, the Ethernet and bridges are initialized. This includes establishing communications between bridges 108/408 and 112/412 via network connection 110/410. Preferably, PCIe connection 114/414 from bridge 112/412 is enabled first, whether or not a device 116/416. At this point, however, even if a device 116/416 is attached, there are no communications with the device because the connection 106/406 to host 104/404 has not yet been enabled. Thereafter, the connection 106/406 is enabled, and the host 104/404 can wait for device 116/416 "attachment".

In step S504, a new PCIe device 116/416 is detected by the PCIe host 104/404. As is known, PCIe devices and hosts follow a standard initialization procedure. Embodiments of the invention use this standard initialization procedure, with additional processing to configure the Ethernet bridge functionality of the invention.

For example, as shown in step S504, when a new PCIe device 116/416 is connected and begins the standard initialization procedure with PCIe host 104/404, link controller 308 in bridge 112/412 first recognizes that the PCIe packets parsed by parser 310 are from a newly connected PCIe device. In response, link controller 308 further causes network controller 306 to assign a network address for the new device for use in upstream communications associated with the new PCIe device over Ethernet 110/410. Likewise, when decapsulated packets from PCIe host 104/404 associated with initializing the new PCIe device are received by link controller 208 in bridge 108/408, link controller 208 recognizes that they are associated with a new PCIe device, and causes network controller 206 to associate the network address with this new PCIe device to use for downstream communications from PCIe host 104/404. All of these operations can be transparent both to the PCIe device and the PCIe host.

Next in step S506, the "virtual" PCIe connection with host 104/404 and new device 116/416 is configured. This procedure generally follows the standard PCIe initialization procedure, as adapted by the present invention and described in more detail below.

After the PCIe connection with the new device is configured, the new PCIe device appears to the CPU 102 and its operating system software like any other PCIe device, with the Ethernet connection 110 completely transparent to CPU 102 and host 104.

In step S508, it is it is determined whether data is needed to be streamed to the device. For example, management software executing on CPU 102 can allow an administrator to selectively cause data to be streamed to any connected display device 160/460 (perhaps via a DMA controller and/or PCIe graphics card, etc.).

In step S510, the data is streamed to the device using the PCIe settings configured in the previous steps. This can include executing conventional data streaming software on CPU system 102. As one non-limiting example, CPU system 102 can be loaded with conventional video playback software (e.g. from a DVD or a stored file on system 102), and the streaming can include streaming video data to the device 160/460. Other example types of streaming can occur as well, include data from device 160/460 to CPU system 102, and other types of data such as audio, etc.

It should be noted that while the term "streaming" is used in the well-known context of playing video or audio content and the like, it is further well known that PCIe is a packet-based protocol. Accordingly, from the PCIe standpoint, the data to be "streamed," regardless of what type of data it is, is all formatted in packets and may not necessarily be considered a "stream" of data.

It is possible that PCIe settings may need to be changed while data is being streamed to a PCIe device, which event is detected in step S512. For example, when the PCIe device is first initialized, the packet size may be set to a size that allows for the bandwidth of the Ethernet connection 110/410 to be fully utilized, albeit with some predetermined bandwidth margin. However, the available bandwidth of connection 110/410 may change.

Figure 9:
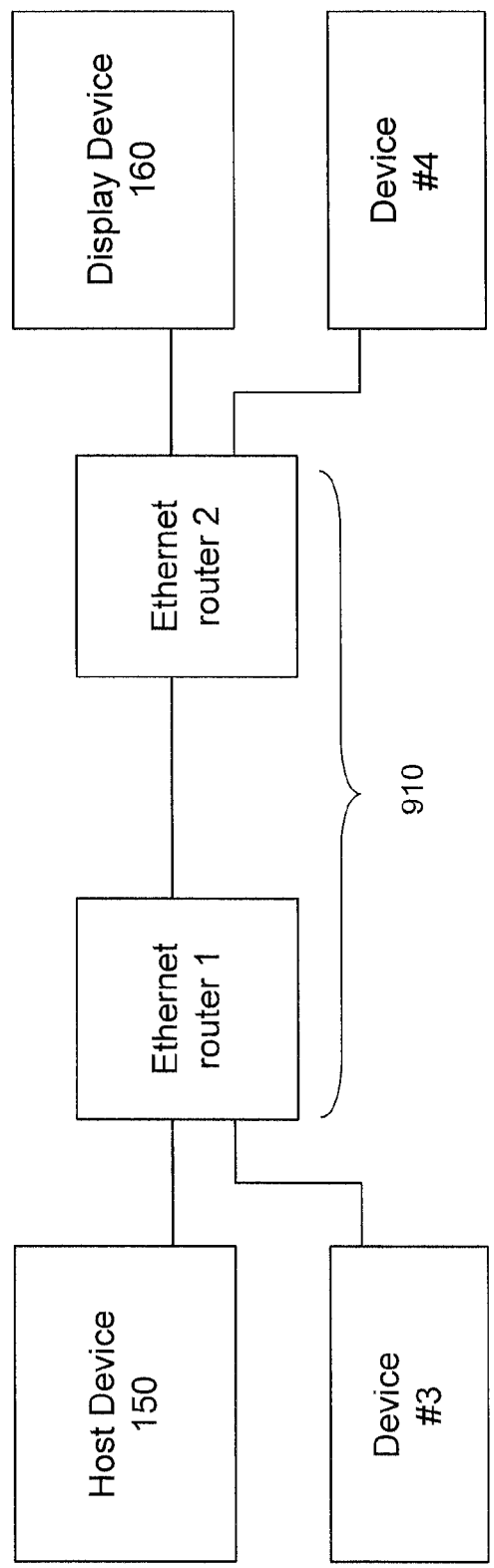
FIG. 9 is a diagram illustrating how network bandwidth can change depending on circumstances and other devices.

For example, FIG. 9 illustrates a possible configuration where the Ethernet connection 910 between host device 150 and display device 160 is shared with other connected devices 3 and 4, and includes routers 1 and 2. The link controllers 208 and 308 in devices 150 and 160, respectively, detect bandwidth changes dynamically, for example by constantly measuring round trip time (RTT) of packets. So when bandwidth suddenly changes, for example, when devices 3 and 4 are exchanging large amounts of data over a short time, the PCIe packet size can be changed to accommodate the lower available bandwidth between devices 150 and 160.

In embodiments, additional processing is performed during streaming of data. For example, in certain embodiments, additional metadata can be added to Ethernet packets such as adding sequence numbers to ensure that transfers over the Ethernet connection are reliably performed. In these and other embodiments, bridges 108 and 112 may include functions for handling dropped Ethernet packets, such as buffering packets and implementing retransmission protocol mechanisms.

In the event that settings need to be changed during streaming of PCIe data, step S514 is performed. For example, link controller 208 causes control packets to be sent to PCIe host 104/404 and PCIe device 116/416 that cause the packet size used by PCIe to be lower to accommodate a lower available bandwidth and/or raised when higher bandwidth is available.

As shown in FIG. 5, a final step S516 includes determining whether streaming of data is complete. If not, streaming continues. Otherwise, processing returns to step S508. Although shown in FIG. 5 for completeness, in embodiments it is possible that no actual processing by bridge 108/408 and/or bridge 112/412 is performed to determine whether streaming is complete.

Figure 6:
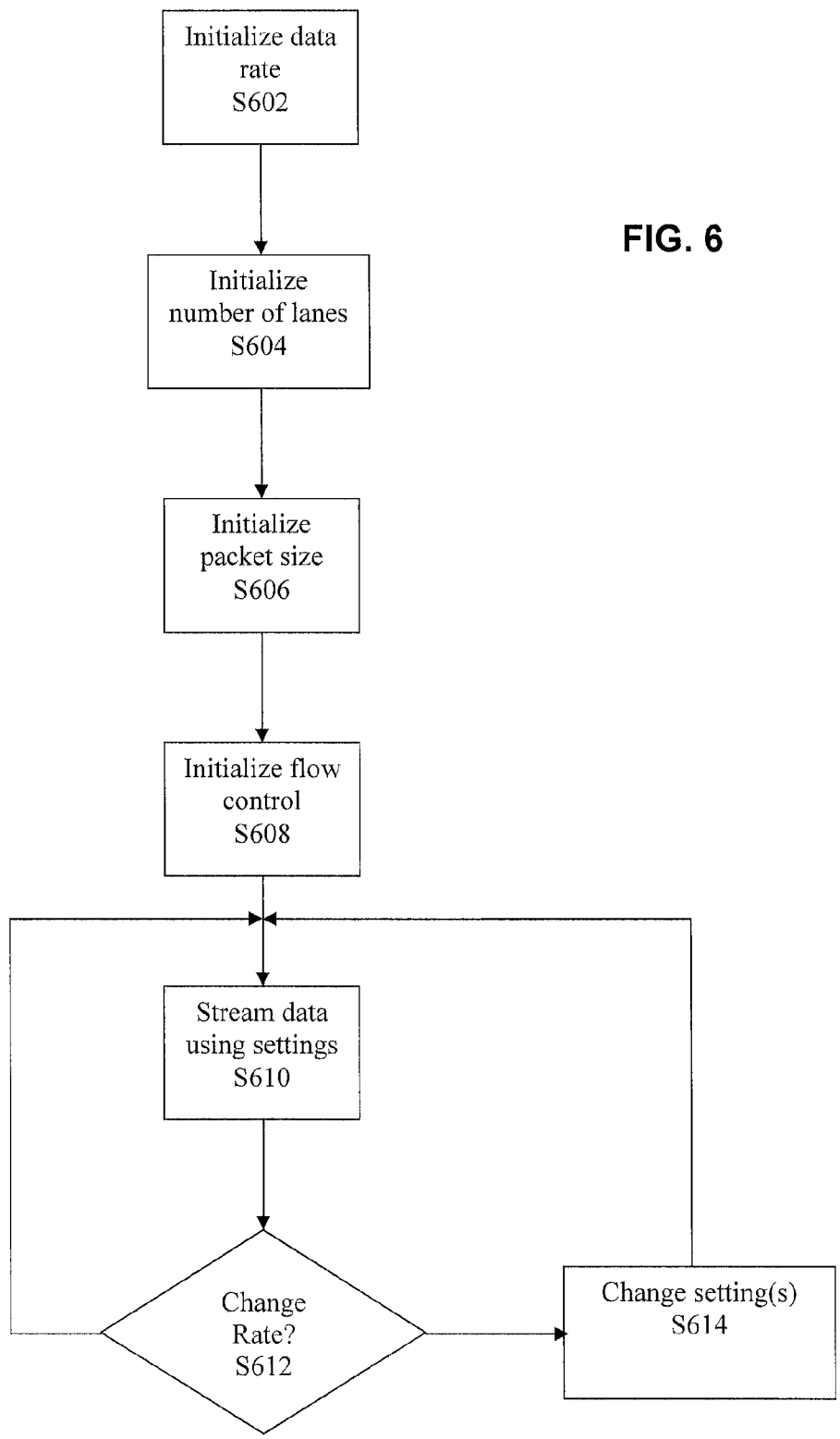
FIG. 6 is a flowchart illustrating an example methodology for configuring a PCIe connection according to embodiments of the invention.

FIG. 6 is a flowchart illustrating additional aspects of initializing and using a PCIe device in an example methodology according to embodiments of the invention.

As mentioned above, PCIe devices and hosts follow a standard initialization procedure. This initialization procedure includes a Link Training sequence, which discovers capabilities of the connection. The initialization procedure also includes an Init FC sequence, which initializes flow control. In embodiments, certain portions of the methodology described in connection with FIG. 6 can be implemented using standard PCIe procedures.

In a first step S602, PCIe host 104/404 negotiates a data rate configuration with PCIe device 116/416. In embodiments, the link controllers in bridges 108/408 and 112/412 intercept the configuration packets sent between the PCIe host and PCIe device and force the PCIe links 106/406 and 114/414 to be configured to operate at the slowest possible rate supported by the PCIe spec. For example, PCIe devices supporting Gen3 and Gen2 rates are configured to operate at a Gen1 rate. The Gen3/Gen2/Gen1 rates are 8 Gbs, 5 Gbs, and 2.5 Gbs respectively.

In a next step S604, PCIe host 104/404 negotiates the number of PCIe lanes used for communications with PCIe device 116/416. In embodiments, the link controller in bridges 108/408 and 112/412 intercept the configuration packets sent between the PCIe host and PCIe device and force the PCIe device 116/416 to be configured use only a single lane, regardless of the number of lanes the device has. Since PCIe devices can have 2, 4, 8 or 16 lanes, the possible lane reduction scenarios forced by embodiments of the invention are 16 to 1, 8 to 1, 4 to 1, and 2 to 1.

In a next step S606, PCIe host 104/404 negotiates a packet size used for communications with PCIe device 116/416. In embodiments, the link controllers in bridges 108/408 and 112/412 intercept the configuration packets sent between the PCIe host and PCIe device and force the PCIe links 106/406 and 114/414 to be configured to use the shortest possible packet size. Reducing packet size effectively increases the ratio of packet header to packet payload, hence reducing the overall rate of useful payload.

In other embodiments, the packet size is configured according to available bandwidth on Ethernet connection 110/410, perhaps with a predetermined margin. This may not require the packet size to be the shortest possible packet size. In one possible embodiment, packet size is first initialized to the smallest possible value, and then gradually increased such as for every data transaction. When an optimal packet size has been reached, any further increase will cause either packet loss or substantial increase in RTT, which when detected, can be used to lower the packet size.

In a next step S608, flow control is initialized between PCIe host 104/404 and PCIe device 116/416. This typically involves the PCIe device 116/416 sending a default amount of PCIe credits to initialize flow control. As is known in the PCIe spec, "credits" indicate how much data of different types (e.g. memory read or write packets) can be outstanding, and these are typically preconfigured to a standard value. A further explanation of using flow control packets according to embodiments of the invention is provided in connection with FIG. 8. Upon completion of the above steps, both bridges are synchronized, such that Ethernet to PCIe Host Bridge 112/412 is ready to receive TLP coming from the PCIe Host 104/404.

In an example application of embodiments of the invention, the slower rates described above enable video to be streamed to a PCIe graphics card 118 via Ethernet connection 110. Accordingly, as shown in step S408, for any video to be streamed, the following steps are performed.

In step S610, PCIe host 104 begins streaming video using the PCIe settings configured in the previous steps. As is known, streaming of video data to a graphics card in a PCIe environment involves sending TLP packets containing the video data using a PCIe Memory Write operation. It should be noted that Memory Read operations can also occur in this process.

As shown, in step S612, the rate at which the packets are sent can be further controlled by controlling the flow of UpdateFC packets back to the PCIe host 104. A PCIe host will not send another TLP packet until it receives an UpdateFC packet from a subsequent Memory Write operation.

Figure 7:
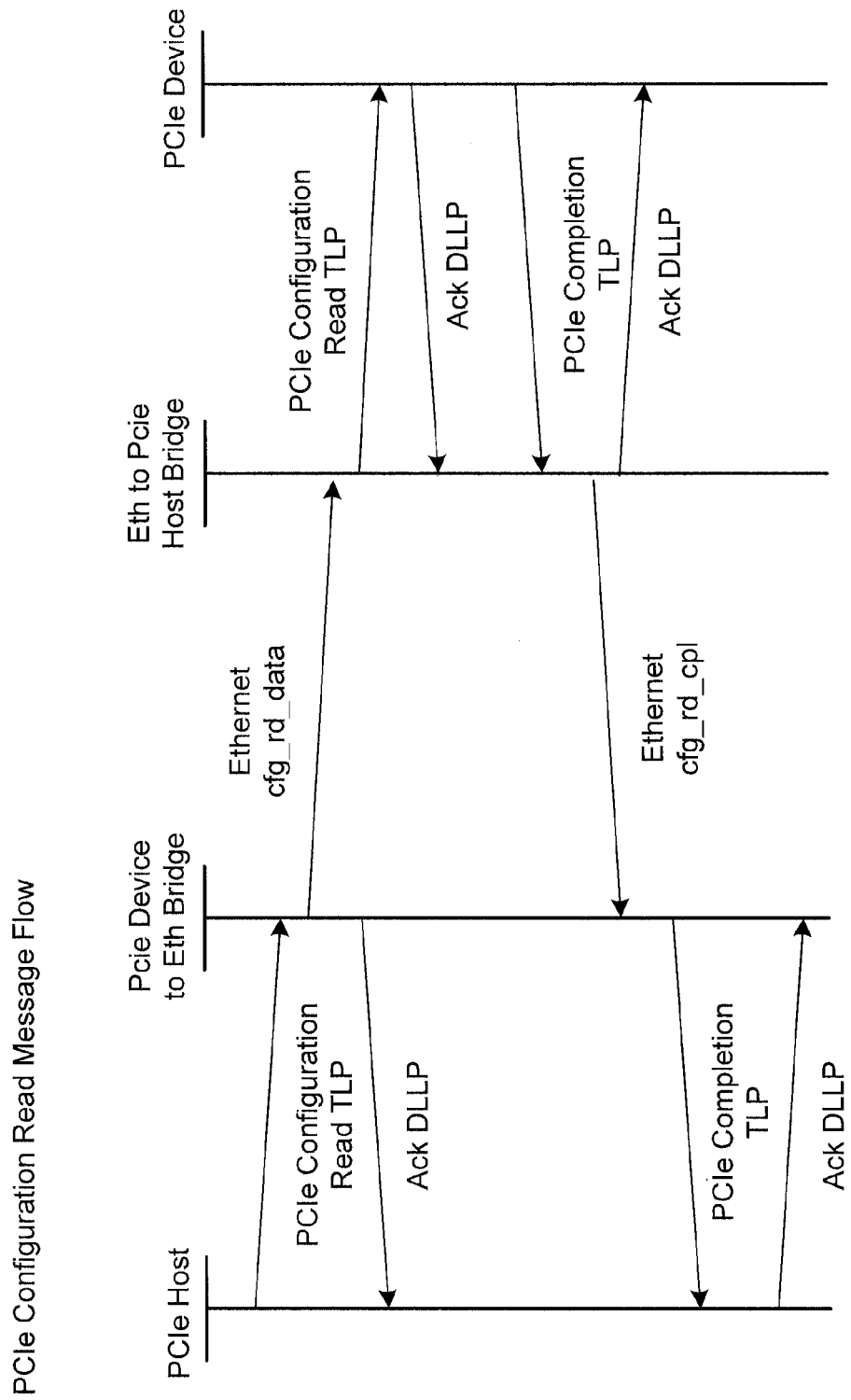
FIG. 7 is a diagram illustrating an example PCIe Configuration Read message flow in a system according to embodiments of the invention.

Certain of the configuration steps shown in the example method of FIG. 6 can be performed using PCIe Configuration Read and Write messages. FIG. 7 illustrates an example of a Configuration Read message flow between PCIe Host 104/404 and Device 116/416 through the two bridges 108/408 and 112/412 according to embodiments of the invention.

Each TLP packet (Configuration and Completion) is immediately acknowledged by the recipient. This is required because the PCI Express protocol imposes very stringent latency requirements for acknowledgement packets. Accordingly, as shown, when PCIe Host 104/404 sends a PCI Configuration Read TLP packet, it is intercepted and immediately acknowledged by PCIe Device to Ethernet Bridge 108/408 with an ACK DLLP packet. Similarly, when PCIe Device 116/416 sends a PCIe Completion TLP packet, Ethernet to PCIe Host bridge 112/412 intercepts it and responds with a ACK DLLP packet.

For relaying Configuration Read and corresponding Configuration Read Completion messages over Ethernet connection 110/410, embodiments of bridges 108/408 and 112/412 take the contents of the TLP packets sent by PCIe host 104/404 and PCIe device 116/416 and insert them into UDP packets. Accordingly, as shown, cfg_rd_data and cfg_rd_cp1 contain payloads of the corresponding Configuration Read and Configuration Read Completion TLP packets wrapped with a UDP header, respectively. Since Ethernet medium is not reliable, both the cfg_rd_data and cfg_rd_cp1 can be retransmitted several times; this is not shown in the drawing for simplifying a discussion of the invention.

The message flow for PCIe Configuration Write and Configuration Write Completion messages is essentially the same as the flow shown in FIG. 7 and described above.

Figure 8:
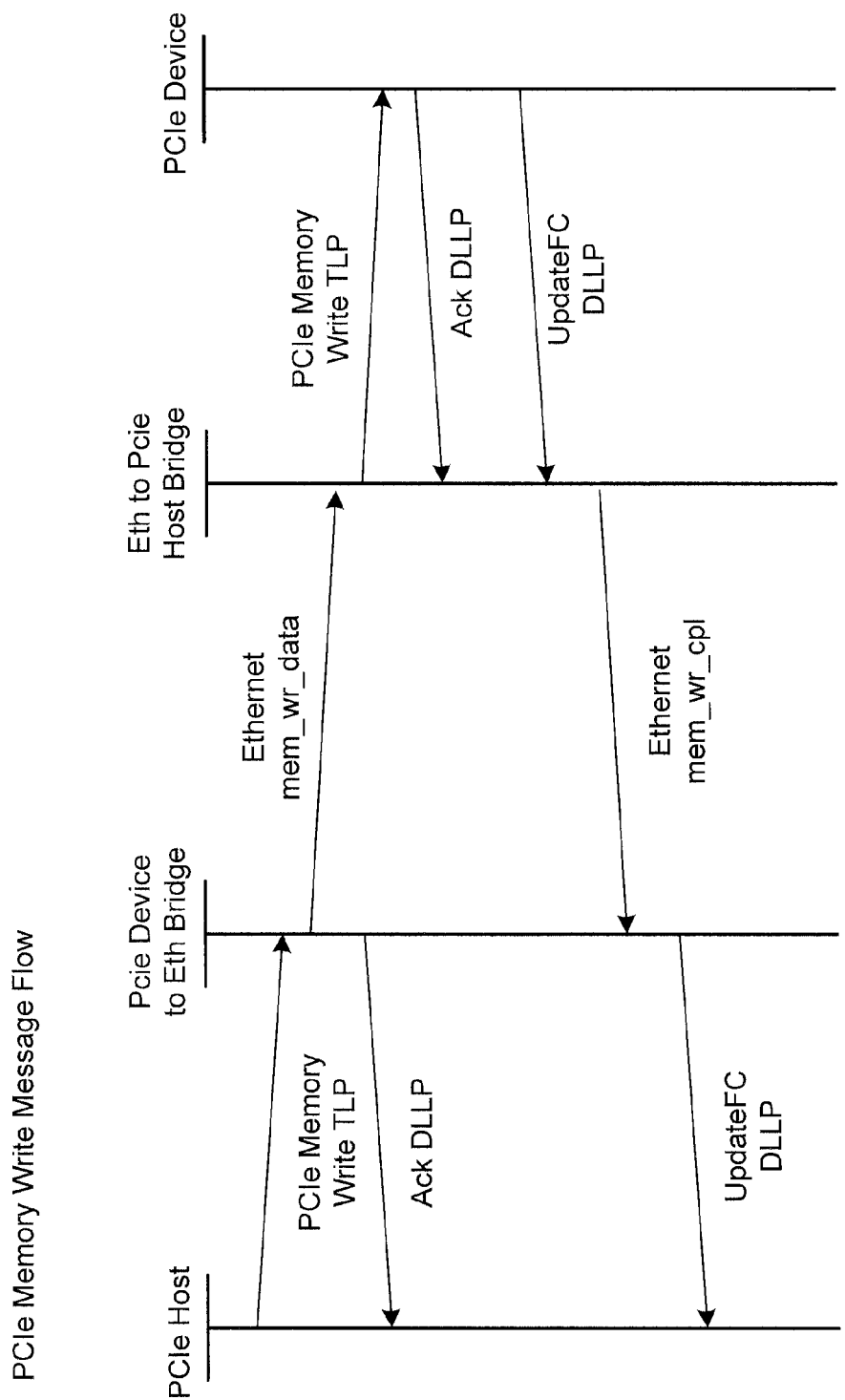
FIG. 8 is a diagram illustrating an example PCIe Memory Write message flow in a system according to embodiments of the invention.

As mentioned above, streaming of video from a PCIe host to a PCIe device is typically performed using PCIe Memory Write messages. FIG. 8 illustrates an example of a Memory Write message flow between PCIe Host 104/404 and Device 116/416 through the two bridges 108/408 and 112/412 according to embodiments of the invention.

As also mentioned above, each Memory Write TLP packet must be immediately acknowledged by the recipient for compliance with PCIe latency requirements. Accordingly, as shown, when PCIe Host 104/404 sends a PCIe Memory Write TLP packet, it is intercepted and immediately acknowledged by PCIe Device to Ethernet Bridge 108/408 with an ACK DLLP packet.

For relaying Memory Write messages over Ethernet connection 110/410, embodiments of bridge 108/408 take the contents of the Memory Write TLP packets sent by PCIe host 104/404 and insert them into UDP packets. Accordingly, as shown, mem_wr_data Ethernet packets contain payloads of the corresponding Memory Write TLP packets wrapped with a UDP header, respectively. PCIe Memory Write TLP packets don't have explicit completion messages. Accordingly, embodiments of the invention include a Ethernet mem_wr_cp1 packet sent to PCIe Device to Ethernet Bridge 108/408 upon receipt of a ACK DLLP and UpdateFC DLLP from PCIe Device 116/416. This lets the Bridge 108/408 know that the Memory Write TLP was successfully delivered to the PCIe Device. Since Ethernet medium is not reliable, both mem_wr_data and mem_wr_cp1 can be retransmitted several times; this is not shown in the drawing for simplicity of the description. It should be noted that UDP protocol ensures reliable delivery of the mem_wr_data packet to its destination.

Another aspect of the invention is controlling the sending of an UpdateFC DLLP back to PCIe host 104/404. This is a special flow control packet that tells the PCIe Host 104/404 that the previous Memory Write TLP was consumed by the PCIe Device, and the Host can send the next one. The Update FC DLLP can be sent to the Host 104/404 only after successful reception of the mem_wr_cp1 by bridge 108/408. This mechanism essentially slows down the effective rate of the PCIe connection, such that a slower Ethernet connection can carry all PCIe packets without loss.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system, comprising:
    a host device including:
        a CPU system;
        a first peripheral connection bus that connects the CPU system to peripheral devices within the system;
        a bus host for managing transfer of data between the CPU system and the peripheral devices via the first peripheral connection bus;
        a host network connection to an external network; and
        a first bridge coupled to the first peripheral connection bus that allows the bus host to communicate with an external peripheral device for transferring data between the CPU system and the external peripheral device via the host network connection and the first peripheral connection bus
        wherein the external peripheral device is adapted to use one or more of a plurality of bus lanes, a plurality of data rates and a plurality of packet sizes for communicating with the bus host, and wherein the first bridge includes a link controller that intercepts configuration packets between the external peripheral device and the bus host that specify using a first number of the one or more of the plurality of bus lanes, the plurality of data rates and the plurality of packet sizes, and wherein the link controller further forces a reduced number of the one or more of the plurality of bus lanes, the plurality of data rates and the plurality of packet sizes less than the first number to be used using the intercepted configuration packets.

2. The system of claim 1, wherein the first peripheral connection bus is a PCIe bus.

3. The system of claim 1, wherein the external network is an Ethernet network.

4. The system of claim 1, wherein data can be transferred on the first peripheral connection bus at a rate substantially higher than a data transfer rate of the external network.

5. The system of claim 1, wherein the data transferred to the external peripheral device is streaming video, and the external peripheral device comprises a graphics card.

6. The system of claim 1, further comprising:
    a display device including:
        a display network connection to the external network;
        a second peripheral connection bus;
        the external peripheral device coupled to the second peripheral connection bus; and
        a second bridge coupled to the second peripheral connection bus and the connection that allows the bus host to communicate with the external peripheral device for transferring data between the CPU system and the external peripheral device via the network connection, the display network connection and the second peripheral connection bus.

7. The system of claim 6, further comprising a plurality of the display devices, wherein the first bridge is configured to cause the network connection to simultaneously carry data streams associated with the plurality of the display devices.

8. The system of claim 1, wherein the first bridge is implemented in a programmable logic device (FPGA).

9. The system of claim 1, wherein the first bridge is implemented in ASIC.

10. The system of claim 1, wherein the first bridge allows the data transfer to be logically transparent to the bus host, and wherein neither software running on the CPU system nor the external peripheral device are aware of the external network connected between them.

11. The system of claim 1, wherein the link controller further intercepts data transactions between the external peripheral device and the bus host subsequent in time to the configuration packets and causes an increased one of the plurality of packet sizes greater than the reduced one of the plurality of packet sizes using the intercepted data transactions.

12. The system of claim 11, wherein the link controller further monitors changes in a performance metric in communications between the external peripheral device and the bus host to determine if the increased one of the plurality of packet sizes should be reduced.

13. The system of claim 12, wherein the performance metric is round trip time (RTT).

14. The system of claim 12, wherein the performance metric is packet loss.

15. The system of claim 1, wherein the external peripheral device is adapted to use flow control packets for communicating a type of data with the bus host, and wherein the link controller further slows a rate of communications between the external peripheral device and the bus host by delaying the flow control packets.

16. The system of claim 15, wherein the flow control packets comprise PCie TLP packets.

17. The system of claim 15, wherein the type of data is video.

* * * * *